United States Patent [19]
Ochs

[11] Patent Number: 5,743,376
[45] Date of Patent: Apr. 28, 1998

[54] SPIRAL FREEZER CONVEYOR BELT INFEED COLLAPSING SYSTEM

[75] Inventor: Gregory L. Ochs, Kirkland, Wash.

[73] Assignee: York International, York, Pa.

[21] Appl. No.: 590,339

[22] Filed: Jan. 23, 1996

[51] Int. Cl.$^6$ ........................................ B65G 13/02
[52] U.S. Cl. .................. 198/778; 198/831; 198/848; 198/792; 62/381
[58] Field of Search ........................ 198/778, 831, 198/848, 792; 62/381

[56] References Cited

U.S. PATENT DOCUMENTS

| | | | |
|---|---|---|---|
| 2,413,339 | 12/1946 | Stadelman | 198/182 |
| 2,635,736 | 4/1953 | Rust | 198/208 |
| 3,777,879 | 12/1973 | Dehne | 198/208 |
| 3,963,115 | 6/1976 | Teske et al. | 198/208 |
| 4,657,131 | 4/1987 | Brychta et al. | 198/810 |
| 4,866,354 | 9/1989 | Miller | 198/778 |
| 4,940,133 | 7/1990 | Roinestad | 198/778 |
| 4,944,162 | 7/1990 | Lang et al. | 198/831 |
| 5,105,934 | 4/1992 | Cawley | 198/778 |
| 5,361,888 | 11/1994 | Brown et al. | 198/347.3 |
| 5,375,695 | 12/1994 | Daringer et al. | 198/778 |

Primary Examiner—William E. Terrell
Assistant Examiner—Khoi H. Tran
Attorney, Agent, or Firm—Harry M. Cross, Jr.

[57] ABSTRACT

A food processing system comprises a food processor, a food product conveyor belt associated and constructed of segments that are longitudinally displaceable relative to one another and linked together to form an endless conveyor belt that extends through the food processor. The conveyor belt is arranged to travel from a lineal course into and through an arcuate course. A conveyor drive drivingly engages with the conveyor belt. A controller is associated with the conveyor drive and a detector for detecting a condition of the conveyor belt at a predetermined location is provided, the controller being responsive to the detected condition for controlling the conveyor drive to displace conveyor belt segments into a collapsed condition so that conveyor belt segments enter the arcuate course from the lineal course in a collapsed condition with inner edges of the conveyor belt segments remaining collapsed as the belt segments enter the arcuate course and with outer edges of the conveyor belt segments expanding apart as the belt segments enter the arcuate course.

10 Claims, 7 Drawing Sheets

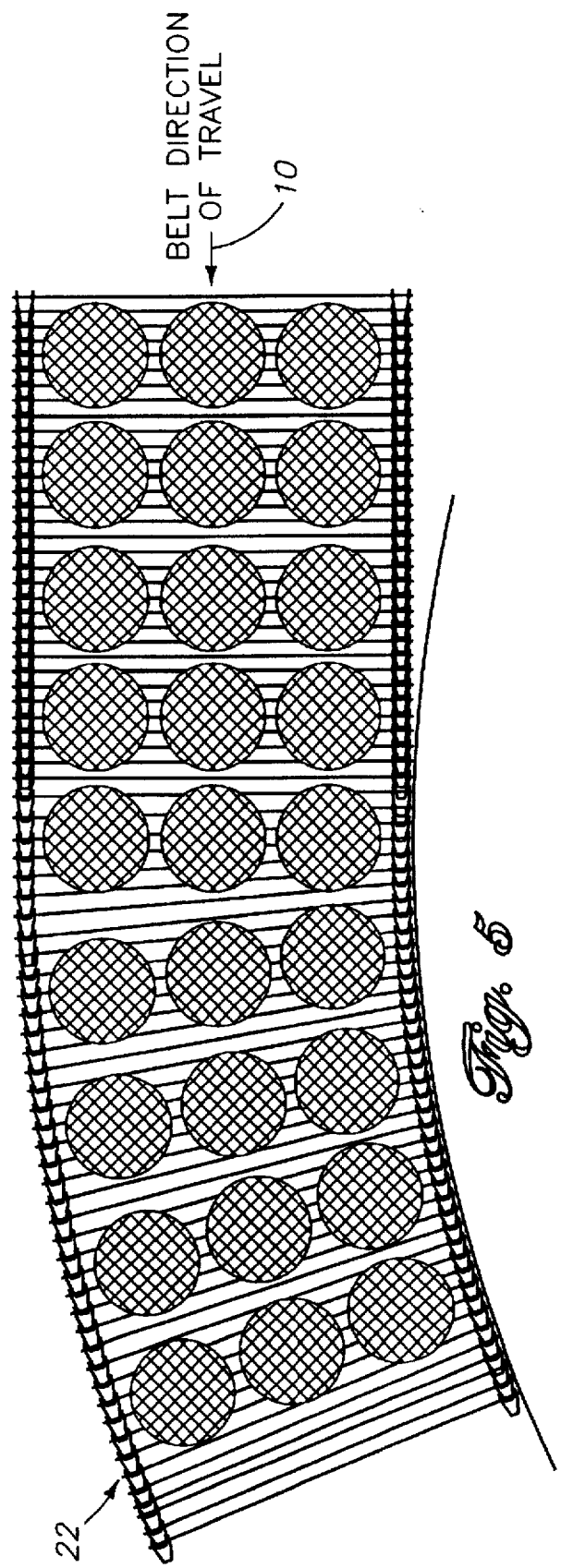

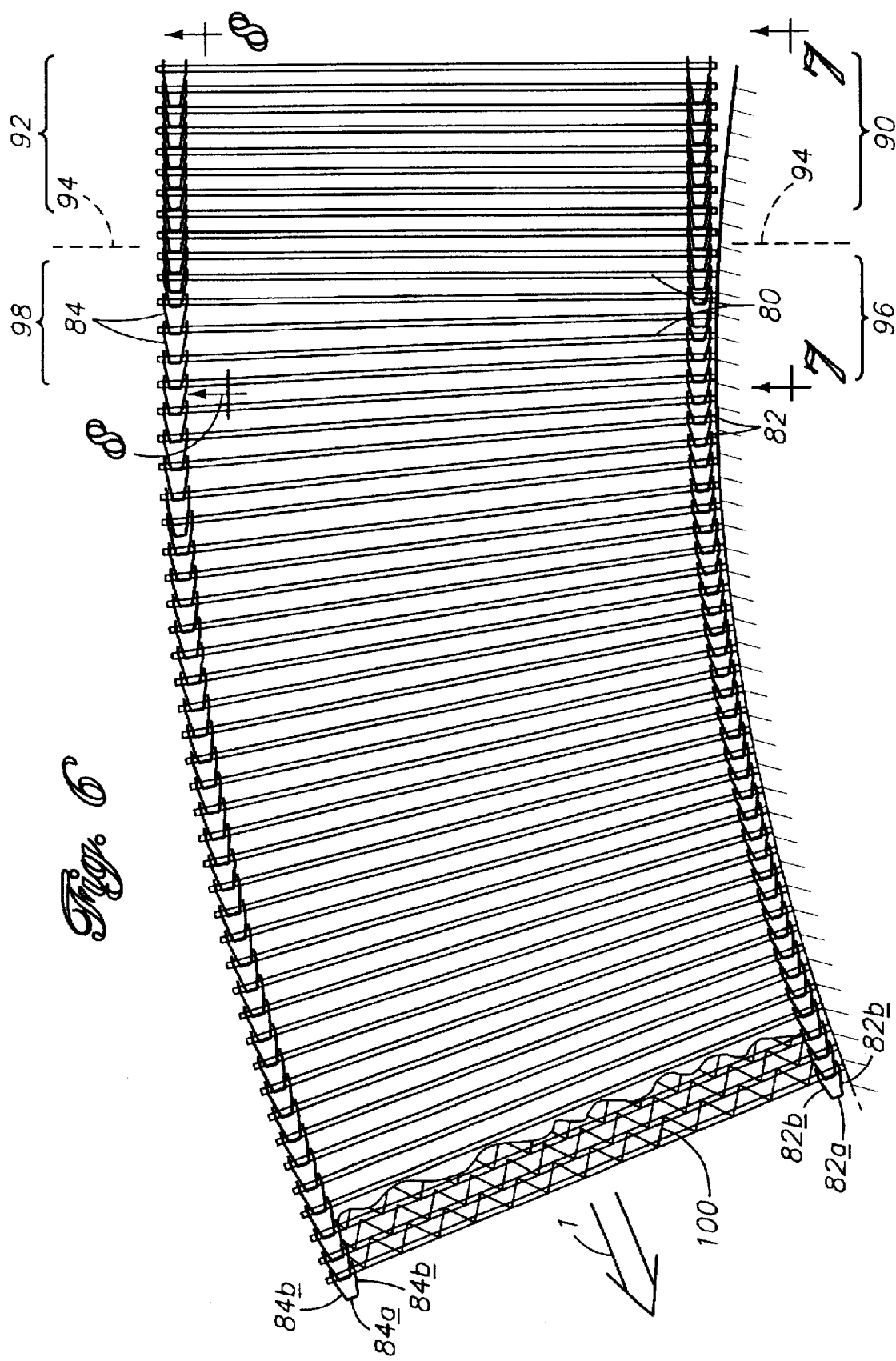

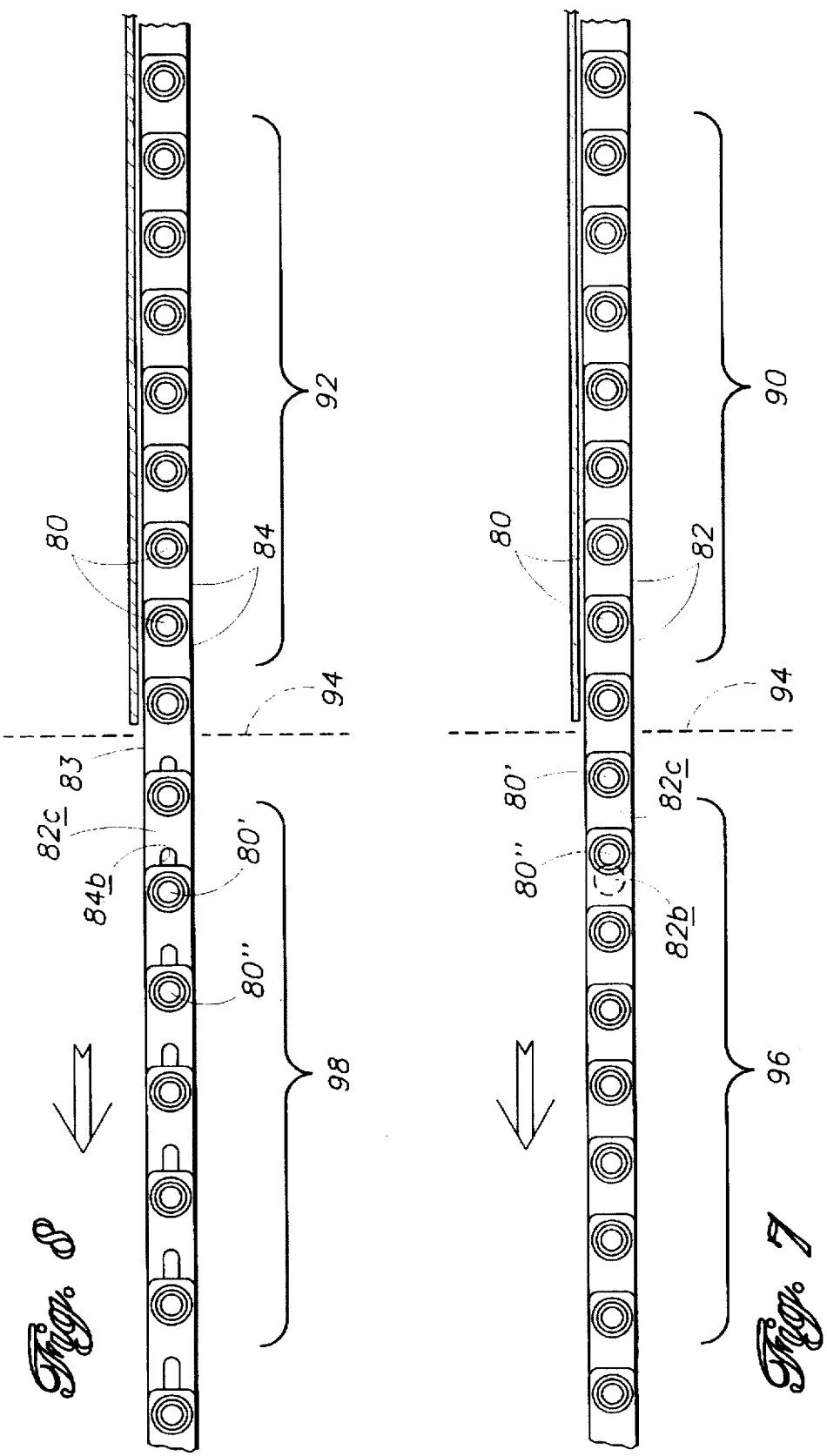

SPIRAL FREEZER CONVEYOR BELT INFEED COLLAPSING SYSTEM

BACKGROUND OF THE INVENTION

1. Field of the Invention

This invention relates to conveyor belts for food processing systems and, more particularly, to endless-type conveyor belts for spiral freezer systems and their conveyor belt drive mechanisms.

2. Brief Description of the Prior Art

Food product conveyor belts systems that are designed to convey food products through a food processing system such as a spiral freezer must be capable of turning laterally from side to side within a plane and of turning transversely from one plane to another. A typical food product spiral freezer system requires the food product conveying belt to travel in a straight line on a horizontal infeed course where fresh food products are deposited onto the belt, and then to turn laterally toward the left or right in a horizontal curve into an arc at the point where the belt enters the spiral freezer compartment, to turn transversely in a vertical curve into an upwardly angled helix in the spiral freezer compartment, to turn transversely into a horizontal outfeed course at the point where the belt leaves the spiral freezer compartment, and then to turn laterally toward the left or right so as to travel in a straight line on the horizontal outfeed course. Furthermore, the conveying belt must also traverse a return course from the end of the outfeed course to the beginning of the infeed course, the return course requiring the belt to travel around end pulleys and cylindrical rolls through various vertical curves to return to the elevation of the infeed course, and to travel through takeup mechanisms that adjust the tension of the belt and account for any slack in the belt. Within a typical spiral freezer compartment, the conveyor belt is generally engaged to a revolving drive drum along the inner edge of the belt so that the belt is pulled along its infeed course and then positively driven through its helical course within the freezer compartment. Also, within a typical spiral freezer system, a return course drive mechanism is employed to pull the belt from its helical course into its outfeed course, thereby effecting a straightening of the belt from a helical arc to a linear path as it enters and traverses the outfeed course.

Conveyor belts designed to operate under such conditions and to traverse such complex courses typically are constructed of transverse rods that are connected by links at the ends of the rods, and a food product supporting surface is carried by the rods. These end links are designed to join adjacent rods in a way that permits the end links on one or both sides of the belt to collapse together and expand apart so as to reduce or enlarge the spacing between the rods along one or both sides of the belts. Also, these end links are designed to join adjacent rods in a way that permits the links to pivot on the rods so that the rods and links can turn transversely, as would be required when the conveyor belt travels around a cylindrical roll or pulley mechanism. Likewise, the food product supporting surface must be provided with sections that are designed to pivot toward and away from one another as the belt turns laterally and to turn transversely as the belt is wrapped around various rolls or pulley mechanisms. In some belt designs, the food product supporting surface is provided by extensions of the end links, the extensions extending across the width of the belt in a zig-zag fashion, and in other belt designs separate elements provide the supporting surface in the form of a wire or plastic mesh forming interlocking segments or sections.

As a consequence of this construction, the conveyor belt can traverse a straight linear course with the belt rods aligned parallel to one another along the linear course. Also, as a consequence of this construction, the conveyor belt can traverse a lateral arc with the belt rods assuming radial configurations with their inner ends closer together and their outer ends further apart. And, the conveyor belt can wrap around a cylindrical roll or pulley mechanism. The food product supporting surface segments or sections are relatively movable so that the supporting surface sections shift together to accommodate the pivoting collapsing movement of the belt rods or shift apart to accommodate the pivoting expanding movement of the belt rods.

There are generally two types of rod and link conveyor belts commonly in use. One such belt has end links designed to enable the rods to collapse together and to expand apart on either or both edges of the belt. The other such belt has end links designed to enable the rods to collapse together and to expand apart only on the outer edge of the belt. Of the first such belt, it is common for the end links to be designed to nest together when the belt enters a lateral curve such that the inner edge of the belt assumes a concave configuration with the inside links nested together so that the inside rod ends are closer together, and such that the outer edge of the belt assumes a convex configuration with the outer links expanded apart so that the outside rod ends are further apart. Of the second such belt, it is common for the spacing between the inside links to be fixed and the spacing between the outside links to be variable so that, when the belt enters a lateral curve, the spacing between the inside rod ends does not change appreciably but the spacing between the outside rod ends expands.

The first such belt has been called a collapsing belt because the relative change in position of the rods, relative to one another, when the belt enters a lateral curve, is accomplished as a result of the inner links collapsing together. U.S. Pat. No. 4,078,655 issued Mar. 14, 1978 describes exemplary collapsing conveyor belt designs. The second such belt has been called an expanding belt because the relative change in position of the rods, relative to one another, when the belt enters a lateral cure, is accomplished as a result of the outer links expanding apart. U.S. Pat. No. 4,867,301 issued Sep. 19, 1989 describes exemplary expanding conveyor belt designs.

The expanding belt design has been considered to be an improvement over the collapsing belt. It is considered to be an improvement because the collapsing belt diminishes the spacing between the inside rods ends, causing the rods to pivot toward one another about their outside ends, whereas the expanding belt increases the spacing between the outside rod ends, causing the rods to pivot away from one another about their inside ends. How this can be an improvement can be seen by visualizing the action of the belt as it traverses the infeed course of a spiral conveyor food freezing system and enters into the helical freezing course. Somewhere along the lineal infeed course, where the belt rods are aligned parallel to one another, fresh food products such as hamburger patties are deposited onto the belt's food product supporting surface. When the conveyor belt begins to make the transition from the lineal infeed course to the arcuate helical freezing course, the belt rods and food product supporting surface sections must shift their positions to enable the belt to turn laterally. In the case of the collapsing belt, the rods and the food product supporting sections will pivot or shift toward adjacent rods and sections. For thin food products, such as hamburger patties, the relative collapsing, pivoting movement of the food product supporting sections can cause the food products to buckle upward so that the fresh food products enter the freezing course in a buckled condition. If the food products enter in a buckled condition, they will be frozen in that condition and will leave the system in that frozen buckle condition and that condition is unacceptable and will result in those food products being rejected. Furthermore, if the fresh food products are deposited onto the infeed course in rows that are too closely spaced together, the relative collapsing, pivoting movement of the food product supporting sections will cause the food products in adjacent rows to be mashed together. The result of food products in adjacent rows being mashed together can be a disfigurement of the food products or a sticking together of those food products that will cause a rejection of the product.

The expanding belt is considered to be an improvement because the expanding apart nature of the belt rods and food product supporting sections will not cause food products to buckle upward or adjacent rows to mash together. The effective movement of the food product supporting sections at the transition from the lineal infeed course to the arcuate helical freezing course is an expansion of the relative surface sections which will not cause fresh food products to be buckled or mashed together. Of course, with an expanding belt, when the conveyor belt leaves the arcuate helical freezing course and enters the outfeed course, the effective movement of the food product supporting sections will be a collapsing movement, a reversal of the expanding movement at the beginning of the helical freezing course. But since the food product will be in a frozen condition, the collapsing movement at that point of the processing cycle cannot cause the frozen food products to buckle, or to become disfigured or stuck together.

There are disadvantages to the expanding belt design, however. The configuration of the expanding belt design is more complex than that of the collapsing belt design. Therefore, the expanding belt design is more expensive. Furthermore, the collapsing belt can be made in standard configurations and used in freezing systems that require the belt to make either left or right hand lateral turns, or both in the same system. However, the expanding belt design requires that the expanding links be differently configured than the fixed links, so that a belt constructed to make left hand lateral turns cannot make right hand lateral turns, and such a belt cannot make both left and right hand lateral turns in the same system. Whereas the collapsing belt is fully expanded in lineal courses, and can be pulled from either or both edges, the expanding belt is fixed at one edge and collapsed at the opposite edge in lineal courses. Consequently, the expanding belt is more sensitive to pulling forces exerted by conveyor belt drive mechanisms and, for a given set of freezing system specifications, will require more elaborate and expensive conveyor belt drive mechanisms and support systems compared to freezing systems employing collapsing belts.

SUMMARY OF THE INVENTION

A primary object of the present invention is to provide a conveyor belt drive system where a collapsing-type rod and link conveyor belt can be employed without compromising food product integrity and quality. Another object of the present invention is to provide such a conveyor belt drive system that can be fitted or retrofitted into present spiral freezer system designs without having to modify the freezer system designs. A further object of the present invention is to provide such a conveyor belt system which converts a collapsing belt into an expanding belt without the disadvantages inherent in the expanding belt design. Still another object of the present invention is to provide a conveyor belt infeed assembly for a spiral freezing system that will effect a collapsing of a collapsing belt in the infeed assembly so that the belt acts as an expanding belt when making the transition from a lineal infeed course to an arcuate helical freezing course. These and other objects and advantages will become apparent from the following description of the invention.

In accordance with the objects of this invention a food processing system incorporating the invention comprises a food processor, and a food product conveyor associated with the food processor comprising a conveyor belt constructed of segments that are longitudinally displaceable relative to one another and linked together to form an endless conveyor belt that extends through the food processor. The conveyor belt is arranged to travel from a lineal course into and through an arcuate course. A conveyor drive drivingly engages with the conveyor belt. A controller is associated with the conveyor drive and a detector for detecting a condition of the conveyor belt at a predetermined location is provided, the controller being responsive to the detected condition for controlling the conveyor drive to displace conveyor belt segments into a collapsed condition so that conveyor belt segments enter the arcuate course from the lineal course in a collapsed condition with inner edges of the conveyor belt segments remaining collapsed as the belt segments enter the arcuate course and with outer edges of the conveyor belt segments expanding apart as the belt segments enter the arcuate course.

BRIEF DESCRIPTION OF THE DRAWINGS

FIG. 5 is an illustrative plan view showing the effect that the FIG. 4 belt has on food products when it enters the arcuate course in a collapsed condition, as the belt makes the transition between lineal and arcuate courses.

FIG. 6 is an illustrative plan view of a section of a segmented, collapsing, link and rod conveyor belt as it would appear just before and after leaving a lineal course and entering an arcuate course;

FIG. 7 is a side elevation view taken along the lines 7—7 of FIG. 6; and

FIG. 8 is a side elevation view taken along the lines 8—8 of FIG. 6.

DESCRIPTION OF THE PREFERRED EMBODIMENT

A primary purpose of this invention is to provide a system to assist in reducing food product deformation associated with a typical collapsing conveyor belt used in spiral or curved conveyor applications. Flat products, such as hamburger patties, that are conveyed on a collapsing belt can suffer deformation when the belt collapses to negotiate a turn. A common solution heretofore has been to substitute an expanding conveyor belt for a collapsing conveyor belt so that the belt expands, rather than contracts or collapses, when negotiating a turn. An expanding conveyor belt, however, has drawbacks when operating in a straight path and when negotiating terminals, in addition to being more expensive and requiring more complex conveyor drive mechanisms. The system of the present invention enables the use of collapsing conveyor belts so as to maintain the favorable operating characteristics of a collapsing belt when traveling in a straight path, while operating like an expanding belt when entering a curved path.

Figure 1:
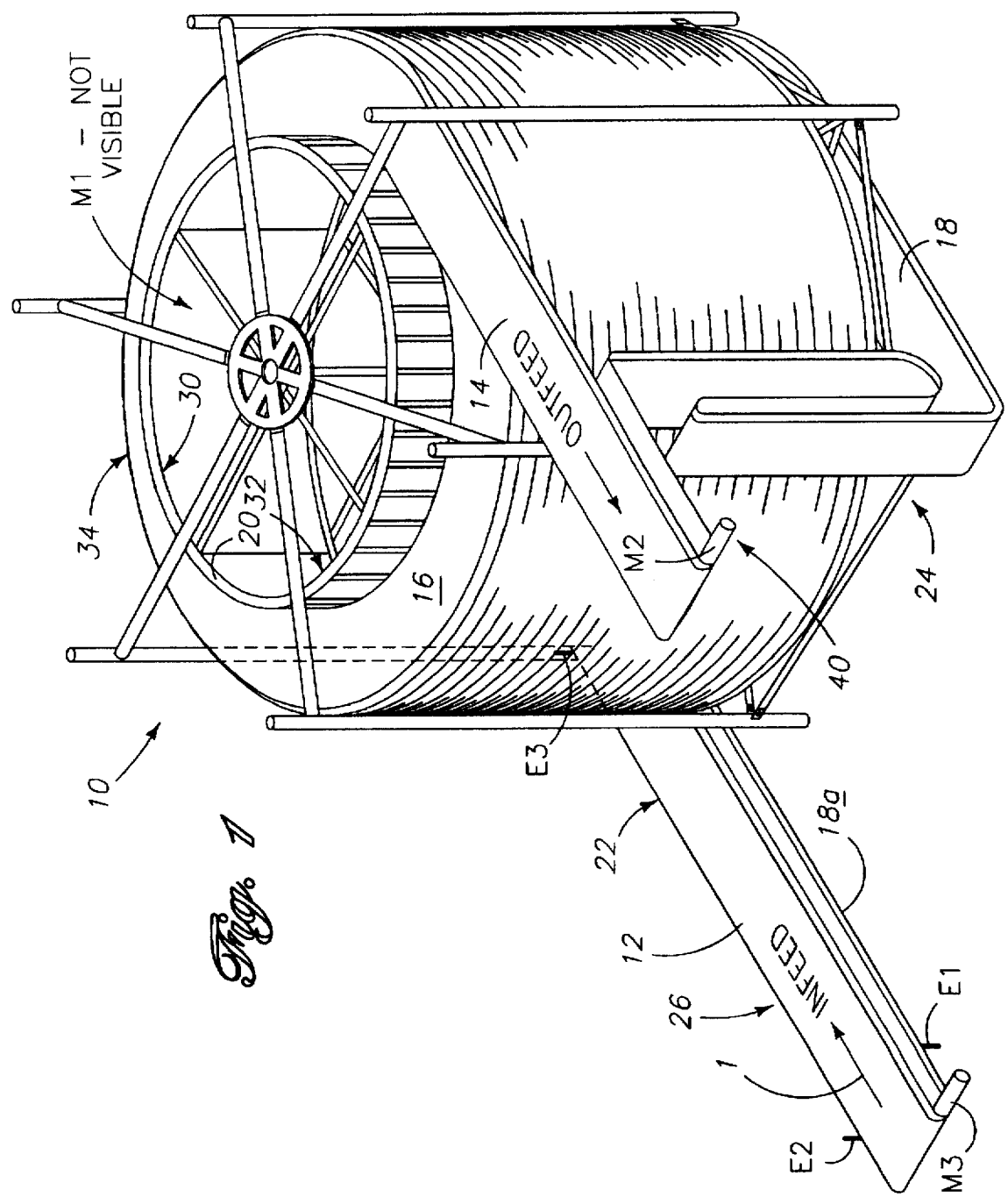
FIG. 1 is perspective view of an exemplary spiral freezing system incorporating the present invention.

FIG. 1 depicts an overall view of a typical spiral freezer system 10, illustrating exemplary conveyor belt drive locations to function with a collapsing conveyor belt. The freezer system illustrated employs an up-drum spiral conveyor where the freezer infeed course 12 is at a lower elevation than the freezer outfeed course 14. The freezer system freezing course is a helical course 16 that rises from the infeed course 12 to the outfeed course 14. The system of the present invention could just as easily work in a down-drum spiral conveyor with the infeed course at a higher elevation and the outfeed course at a lower elevation. A main drive M1 (not shown in FIG. 1) within the drum 20 drives drum 20 to revolve at a predetermined speed in a manner well known in the art. Drum 20 is appropriately engaged with the conveyor belt 22, in a manner well known in the art, to cause conveyor belt 22 to travel upward in the helical freezing course 16 around the periphery of the drum. The conveyor belt 22, as it traverses the drum periphery, may be supported in any manner of ways, all well known in the art, including being at least partially self-supporting. A take-up drive M2 drives a take-up and return section 24 so as to pull the conveyor belt 22 along the outfeed course 14 and direct the conveyor belt into the return course 18. As is well known in the art, the return course 18 is provided with an appropriate take-up to adjust for any unsuitable slack in the belt and with appropriate idler rollers to return the conveyor belt to the infeed course 12. An infeed drive M3 drives an infeed section 26 so as to pull the conveyor belt along the return course 18 and direct the conveyor belt into the infeed course 12.

Figure 3:
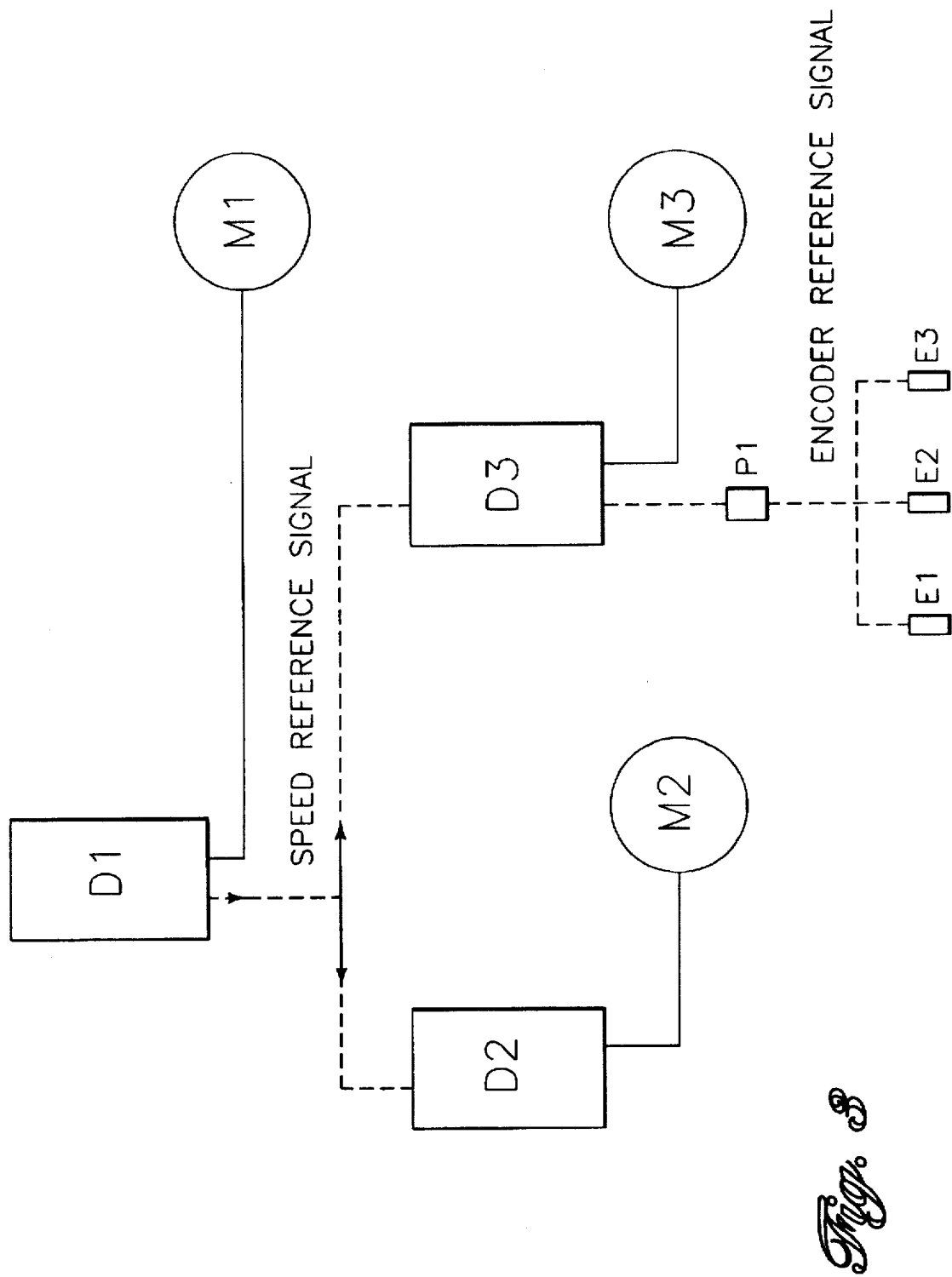
FIG. 3 is a control logic diagram for operating the system of the present invention.

Drives M1, M2 and M3 are interconnected by a control system such as that shown in FIG. 3. Each of these three drives is coupled to a drive controller D1, D2 and D3, respectively. Drive controller D1 is the controlling drive for the entire system. The take-up and infeed drives controllers, D2 and D3, control their respective drives M2 and M3 to operate at a particular speed relative to main drive M1. During operation, the main drive controller D1 sends a scalable speed reference signal to both the take-up and infeed drive controllers D2 and D3. The infeed drive M3 is adjusted by way of a PID loop controller P1 as a result of information received from three encoders E1, E2 and E3. These encoders monitor the conveyor belt and the PID loop controller P1 adjusts M3 as a result of the output from the encoders. Drive M3 is adjusted by controller D3 to effect a uniform desired belt condition at a location determined by the location of encoder E3.

Encoders E1, E2 and E3 can conveniently monitor the spacing of selected belt components, such as the spacing of the links or the rods in the case of a segmented link and rod belt configuration. By detecting a change in the sensed spacing, appropriate adjustments in M3 can be effected to maintain the desired belt condition at the locus of E3 and between E2 and E3.

As applied to the control of a collapsing conveyor belt in accordance with the principles of the present invention, encoder E1 is located to monitor the conveyor belt at a point where the belt is expanded and this condition is used as a reference point. The output signals from encoders E2 and E3 are scaled relative to the output from encoder E1 in PID loop controller P1 and drive M3 is adjusted to maintain a uniform belt condition at the location of encoder E3. Drive M3 is a belt collapsing drive and it is controlled through controller D3 to maintain the conveyor belt in a collapsed condition at the location of encoder E3. Encoder E2 is located downstream of the belt collapsing drive M3, in the direction of belt travel, and, with encoder E3, insures that the conveyor belt is maintained in a collapsed condition between encoders E2 and E3. In a spiral freezer environment, such as illustrated in FIG. 1, encoder E3 is located near the point of tangency where the belt leaves the straight line infeed course 12 and enters the helical freezing course 16.

As shown in FIG. 1, drive M3 is located at the infeed terminal at the beginning of the infeed course 12 and drive M2 is located at the outfeed terminal at the end of the outfeed course 14. These drives could be located elsewhere so long as their respective functions in the food processing infeed and outfeed sections of the system are carried out. Drive M3, for example, might be located in that portion 18a (seen in FIG. 2) of the return course 18 that underlies the infeed course 12. Drive M1 is the primary drive in that it and its controller D1 control the travel of the conveyor belt through the food processing section of the system. Alternately to driving a drum that engages the inside edge of the conveyor belt within the helical freezing course 18, other configurations of mechanisms are known by which the conveyor belt may be engaged to be driven through the helical conveyor course, and main drive M1 will be the primary drive that effects travel of the conveyor belt through the helical freezing course. The control system depicted in FIGS. 1 and 3 may be employed to similar advantage in controlling the operating conditions of a collapsing belt in other kinds of continuous processes, such as food product heating or cooking conveyor belt processes.

Figure 2:
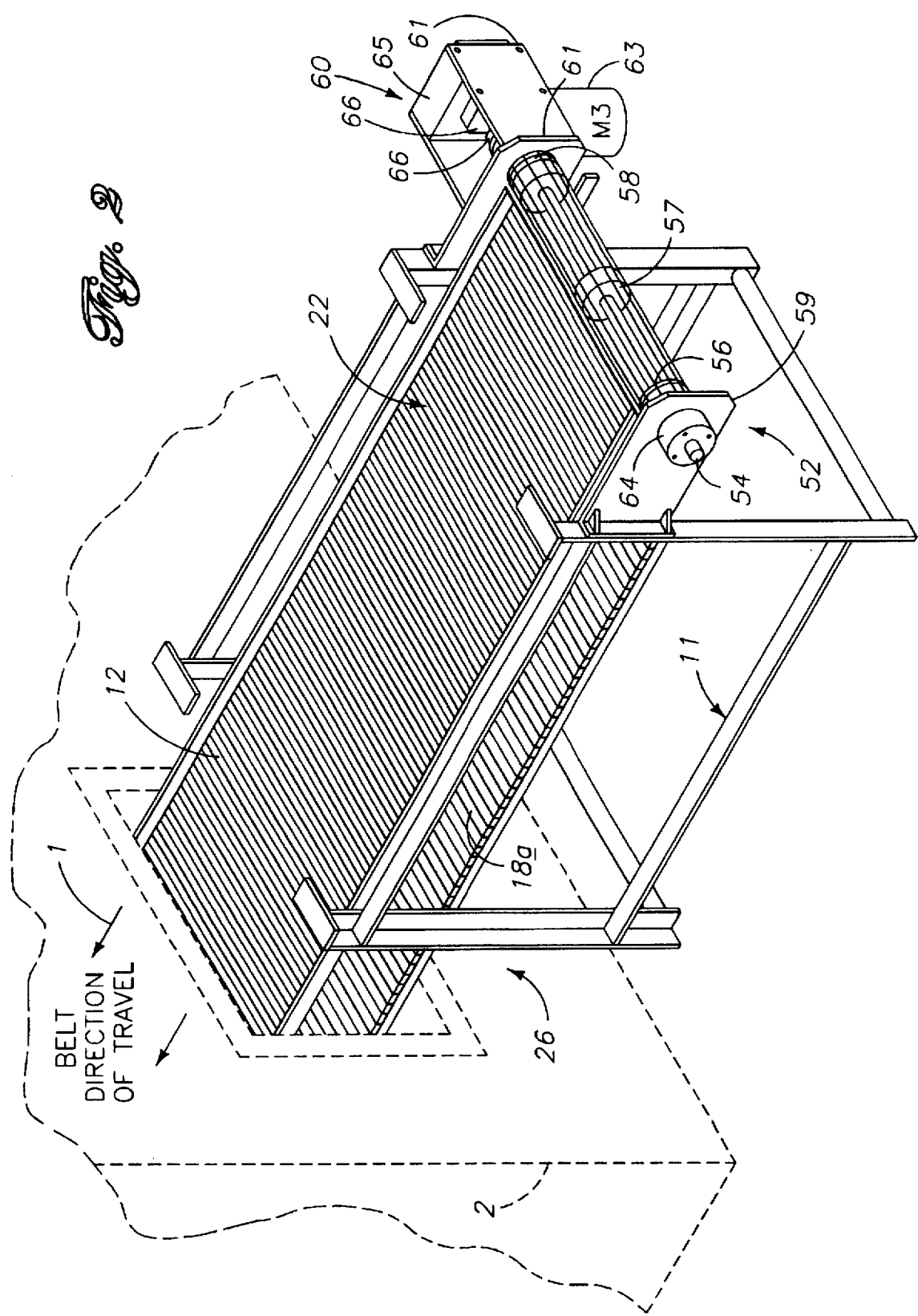
FIG. 2 is a perspective view of an exemplary infeed assembly for a food product freezing system.

FIG. 2 further illustrates the relationship of the infeed drive M3 and the conveyor infeed section 26. Referring to FIG. 2, drive M3 comprises a conveyor drive assembly 52 and motor drive assembly 60. Conveyor drive assembly 52 comprises a drive shaft 54, left and right conveyor belt drive sprockets 56, 58 affixed to shaft 54, and left and right mounting brackets 59, 61 that mount drive shaft 54 to the outer end of the structural framework 11 for infeed section 26. The outer end of shaft 54 is mounted to left bracket 59 by a bearing block 64 fastened to the outer side of bracket 59. The inner end of shaft 54 is mounted to right bracket 61 by a bearing block 66 fastened to the outer side of bracket 61. Drive shaft 54 also mounts an idler guide roll 57 at its midpoint. Belt 22 is wrapped around drive sprockets 56, 58 and idler roll 57 and is drivingly engaged with the cogs of sprockets 56, 58. Drive shaft 54 is rotatable in a direction to cause belt 22 to move in the direction of indicator arrow 1 to carry belt 22 from the underlaying return course 18a up around sprockets 56, 58 to the overlaying infeed course 12.

Figure 4:
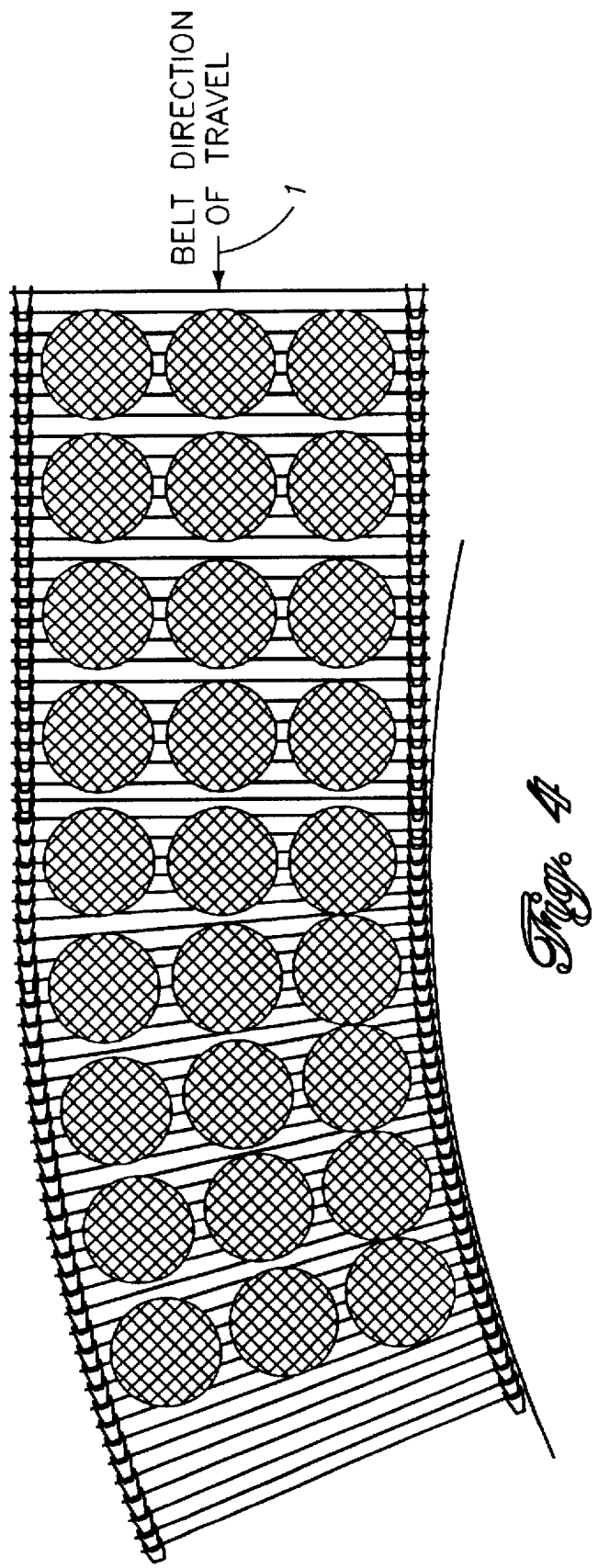
FIG. 4 is an illustrative plan view showing the effect that a collapsing belt has on food products as the belt makes the transition between lineal and arcuate courses.

The belt collapsing drive M3 is not limited to a shaft and sprocket belt-engaging assembly as the only means of drivingly engaging the belt. A friction drive mechanism that engages the belt segments and crowds them together into a collapsed condition, for example, could be employed. When the belt is provided as link and rod segments, however, where the edge links are U-shaped in configuration, such edge links lend themselves to engagement with the sprocket teeth of drive sprockets that are carried by a drive shaft as seen in FIG. 4.

Drive shaft 54 is rotated by a motor assembly 60 comprising a gear motor 63 that is mounted to bracket 61 by a housing mounting bracket 64. Motor 63 drivingly engages shaft 54 through a gearbox 65 and through a coupling subassembly 66. Motor assembly 60 rotates drive shaft 54 in response to control signals transmitted by controller D3.

The variable drive ability of drive M3, as controlled in the manner described above, enables the use of a collapsing belt configuration for conveyor belt 22. A simplified example of a collapsing belt is depicted in FIGS. 6–8 as comprising a plurality of transverse rods 80 that are connected at their ends by connecting inside links 82 and outside links 84. Each link connects the ends of two adjacent rods. The links themselves are configured so that adjacent links can collapse together in a nesting fashion so that the linked ends of the adjacent rods can be moved closer together. The links are also configured so that adjacent links can expand apart so that the linked ends of the adjacent rods can be moved further apart. By appropriate control of drive M3, as described above, the collapsing belt can be driven to collapse the links and rods toward one another so that the inside and outside links are nested together, such as is shown in FIGS. 6–8 at 90 and 92. Consequently, when the collapsing belt reaches the point of tangency 94, where the belt leaves a straight line path and enters a curved path, the inside links and rod ends will remain collapsed together while the outside links and rod ends will expand apart, such as is shown in FIGS. 6–8 at 96 and 98, so that the rods become oriented radially for travel along the helical freezing course.

The inside and outside links, as seen in FIGS. 6–8, may comprise generally U-shaped elements with their respective closed ends or bases, 82a, 84a, leading in the direction of belt travel. The link sides 82b, 84b of the U-shaped elements trail the bases. Each link is fixed to a trailing rod, such as rod 80' in FIGS. 7 and 8, such as by being welded thereto. Also, each link has a leading rod, such as rod 80" in FIGS. 7 and 8, loosely confined within elongated slots 82b, 84b that are provided in the U-shaped link sides 82c, 84c in front of the link connection to the trailing rod. When the rods and links are collapsed together, the nesting of the links is achieved by the leading rods shifting to the rear of the link slots. When the rods and links are expanded apart, the leading rods shift to the front of the link slots. Since the location of the trailing rods with respect to the links to which they are attached remains static, the shifting of the leading rods rearward and forward relative to the links accounts for the collapsing and expanding of the belt.

FIG. 7 depicts the condition of the inside edge of the collapsing belt just before and after the point of tangency 94. The inside edge remains fully collapsed. FIG. 8 depicts the condition of the outside edge of the collapsing belt just before and after the point of tangency 94; being fully collapsed before the point of tangency and fully expanded shortly after the point of tangency. FIG. 8 further depicts an outside link 83 at the point of tangency 94 with its leading rod only partially shifted forward in the link slot, to indicate that the outside links and rod ends will transition from a fully collapsed condition through a partially expanded condition to a fully expanded condition in a short space as the belt proceeds through the point of tangency 94.

The conveyor belt 22 is provided with a product support, such as the wire mesh indicated at 100 in FIG. 6, upon which products are carried after being deposited on the belt at the infeed section. Typically, the product support is fabricated from stainless steel wire or plastic. The product support is fabricated in a form that provides a product support surface above the rods that enable the rods to shift position. In some cases, the product support surface will remain fairly static as the rods shift during belt collapse and expansion. In other cases, the product support surface will collapse and expand along with the collapse and expansion of the belt. In still other cases, the links and product support may be integral with one portion providing the function of the edge links as described above and with the other portion providing a product support surface.

Spiral Food Freezers, of the type illustrated in FIG. 1, comprise a freezer housing 2 within which an endless product conveyor belt 22 is transported from a product infeed section 26 to a product outfeed section 24. Food products are deposited on the conveyor belt 22 at the infeed section 26, are frozen to the degree required within the housing 2, and are deposited to further handling or processing systems from the outfeed section 24. A primary advantage of a spiral food freezer system is that a substantial food processing time can be achieved for a given floor area occupied by the system. This advantage is achieved by providing, within housing 2, a central drum conveyor assembly 30 that has a conveyor belt-driving drum 32 that is rotated about a vertical axis, and a helical conveyor assembly 34. The conveyor belt 22 receives food product at the infeed section 26; travels from the infeed section 26 into the housing 2 and through the helical conveyor assembly 34, entering at the bottom of the belt-driving drum 32 and leaving at the top; and then travels through the outfeed section 24, where the food product is deposited from the conveyor belt, and returns to the infeed section 26. Thus, the conveyor belt 22 travels from an infeed course 12, through a helical course 16, to an outfeed course 14, and then returns through a return course 18. It is typical of spiral food freezer systems to have the infeed and outfeed courses 12, 14 to be linearly straight, tangent to the helical course 16, and linearly-aligned with one another—albeit at different elevations. Therefore, at least the final portion of the return course 18a is linearly straight, also.

In a typical spiral food freezer system, the conveyor belt 22 and the belt-driving drum 32 are cooperatively associated so that the drum 32 and the inner edge of the belt 22 are brought together in a suitable fashion whereby the rotating drum 32 drives the belt 22 around its helical course 16. This may be accomplished by a frictional engagement of the two, or it may be accomplished by a positive, physical interlocking engagement of the two. In addition to the driving force imparted by the drum 32, a secondary conveyor belt driving assembly 40 is provided in the housing 2, adjacent the outfeed section 24, and within the path of the return course 18. This secondary driving assembly 40 aids in pulling the belt 22 through and from the drum conveyor assembly 30 and through the outfeed section 24. In typical systems, however, transport of the belt 22 from the secondary driving assembly 40 to the entry into the drum conveyor assembly 30 is unassisted. Therefore, the tension in the belt segments within the return and infeed courses 18, 12, extending from the secondary driving assembly 40 to the drum conveyor assembly 30, rises significantly as the belt segments approach the drum conveyor assembly infeed. In order to limit these tension forces to an acceptable degree, various design considerations must be compromised, such as the configuration of conveyor belt 22, the tolerable length of the infeed section 26, the configuration of the drum conveyor assembly 30, the speed of the drum conveyor assembly 30 and so forth.

The present invention, however, is not typical in that the infeed drive M3 is provided in the infeed section 28. This system is designed to pull the conveyor belt 22 along the return course 18 and to deliver the belt segments to the infeed course 12 in an untensed and collapsed condition. The drum conveyor assembly 30 will not have to overcome resistive forces within the return course 18. As a result, the tension in the conveyor belt segments as they reach the drum conveyor assembly 30 will be reduced. Furthermore, where it would be desirable to increase the length of the infeed course 12, this may be accomplished by employing the infeed drive system of the present invention without creating an intolerable stress on the belt segments as they enter the drum conveyor assembly infeed or on the drum conveyor assembly 30 itself.

FIGS. 4 and 5 compare and contrast the operation of a collapsing belt which leads into a curve in an expanded condition (FIG. 4) with the belt leading into a curve in a collapsed condition (FIG. 5). FIG. 5 represents the present invention and clearly shows that rows of food products can be deposited on the belt without causing the food products to mash together in the curve, whereas the same spacing on an uncollapsed belt (FIG. 4) would result in undesirable mashing of food products in adjacent rows. FIGS. 4 and 5 clearly indicate the superiority of the present invention employing a collapsing belt in a different mode of operation than heretofore known. By employing the present invention, for a given food processing system, greater throughput can be attained without product damage.

Conveyor belt 22 is flexible and selectively, longitudinally adjustable because the belt segments, such as the edge links and the rods of the belt depicted in FIG. 6, are displaceable relative to one another, i.e. toward and away from one another, along the longitudinal extent of the belt. Consequently, belt 22 can be drawn around various driving and idler rolls as required by the spiral freezing system, such as depicted in FIG. 1; and can be drawn from a linear, straight section such as infeed course 12 into a curved section such as helical course 16, and from a curved section such as helical course 16 into a linear, straight section such as outfeed course 14. The various belt segments that make up belt 22, therefore, must structurally accommodate turning transversely, i.e. perpendicular to the plane of the belt from one spatial plane to another, as would be required when the belt traverses a drive or an idler roll; and laterally within a spatial plane as would be required when the belt is drawn into and out of its helical course 16. A common belt configuration for belt 22 comprises a multiplicity of transverse rods that are linked together at their ends by interlocking links, the interlocking links permitting the belt 22 to turn transversely (i.e. perpendicularly to the plane of the belt) and laterally (i.e. within the plane of the belt). In the present invention, when the belt segments are drawn from the linear, straight course 12, into a lateral curve when entering course 16, the inner edges of the belt segments will remain condensed together and the outer edges will expand apart to enable the belt to traverse the lateral curve. Likewise, when the belt segments are drawn from lateral curve in course 16 into the straight, linear course 14, the inner edges of the belt segments will expand apart and the outer edges will remain expanded apart to enable the belt to traverse the straight section.

As seen in FIGS. 2, 7 and 8, the portion of the conveyor belt 22 that is collapsed, along infeed course 18, is maintained in a flat condition by side guides 3 and 4. These guide 3 and 4 prevent the collapsed belt from buckling as drive M3 moves the belt toward the point of tangency 94. In the system shown in FIG. 4, the belt driving sprockets 56, 58 engage the expanded belt segments leaving the end of return course 18a and collapses them together so that the collapsed segments move together toward the inlet to the helical freezer housing 2. In order to accomplish this collapsing action, drives M3, M2 and M1 must be synchronized so that the expanded belt segments feeding into sprockets 56, 58 can be collapsed and maintained in a collapsed condition by the time that they reach the housing inlet. Since the belt segments are displaceable toward and away from one another, the tendency will be that the collapsed belt segments will advance along the infeed course 12 in a start and stop fashion as each formerly-expanded segment is collapsed against the trailing end of the collapsed belt portion. In order to make sure that the advancing collapsed belt portion does not buckle and jam or become untracked, guides 3 and 4 are located at the infeed section 26 to overlay the collapsed belt edges. Guides 3 and 4 need only overlay the side edge belt links to accomplish this task. If the belt collapsing drive M3 is located somewhere else in the infeed section 26, such as in the return course 18a, guides 3 and 4 will commence just upstream of the drive M3.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A food processing system comprising a food processor; a food product conveyor associated with said food processor comprising a conveyor belt constructed of segments that are displaceable relative to one another and linked together to form an endless conveyor belt that extends through said food processor, said conveyor belt being arranged to travel from a lineal course into and through an arcuate course; a conveyor drive drivingly engaged with said conveyor belt; a controller associated with said conveyor drive; a detector for detecting a condition of said conveyor belt at a predetermined location; said controller being responsive to the detected condition for controlling said conveyor drive to displace conveyor belt segments into a collapsed condition so that conveyor belt segments enter said arcuate course from said lineal course in a collapsed condition with inner edges of said conveyor belt segments remaining collapsed as the belt segments enter said arcuate course and with outer edges of said conveyor belt segments expanding apart as the belt segments enter said arcuate course.

2. The system of claim 1 wherein said conveyor belt is a collapsing belt of the kind constructed of a plurality of transverse segments linked together to form an endless conveyor belt formed of interlocking belt segments that can be expanded apart and condensed together so as to enable said conveyor belt to travel through transverse curves; and wherein said detector is located so as to detect a collapsed condition of said belt near the commencement of a transverse curve; and wherein said controller controls the operation of said conveyor drive to maintain said conveyor belt in a collapsed condition at the location of said detector so that an inside edge of said conveyor belt remains in a collapsed condition as the transverse segments traverse a transverse curve and so that an outside edge of said conveyor belt expands to an expanded condition as the transverse segments enter a transverse curve.

3. The system of claim 1 wherein said food processor comprises a spiral food freezer comprising a food product inlet, a food processing section and a food product outlet; and wherein said food product conveyor comprises a lineal infeed course terminating at said food product inlet for receiving food products and delivering such food products to said food product inlet, a spiral food processing course extending through said food processing section from said food product inlet to said food product outlet, an outfeed course, and a return course extending from said outfeed course to said infeed course; wherein said conveyor drive maintains said conveyor belt in a collapsed condition along said infeed course so that said transverse segments can shift into a radial alignment at the commencement of said spiral food processing course; and wherein said detector is located adjacent to the commencement of said spiral food processing course.

4. The system of claim 2 wherein said conveyor drive comprises drive shaft means, sprocket means engaged with said conveyor belt, and motor means connected to said drive shaft means; wherein said detector comprises an encoder disposed adjacent to said conveyor belt so that spacing between selected belt components can be detected; and wherein said controller means comprises circuit means coupled to said detector and to said motor means for controlling said motor means.

5. The system of claim 3 wherein said conveyor drive comprises drive shaft means, sprocket means engaged with said conveyor belt in said infeed course, and motor means connected to said drive shaft means; wherein said detector comprises an encoder disposed adjacent to said conveyor belt in said infeed course so that spacing between selected belt components can be detected; and wherein said controller means comprises circuit means coupled to said detector and to said motor means for controlling said motor means.

6. A food processing system comprising a food processor; a food product conveyor associated with said food processor comprising a conveyor belt constructed of segments that are displaceable relative to one another and linked together to form an endless conveyor belt that extends through said food processor, said conveyor belt being arranged to travel from a lineal course into and through an arcuate course; a conveyor drive means drivingly engaged with said conveyor belt; controller means associated with said conveyor drive means; detector means for detecting a condition of said conveyor belt at a predetermined location; said controller means being responsive to the detected condition for controlling said conveyor drive means to displace conveyor belt segments into a collapsed condition so that conveyor belt segments enter said arcuate course from said lineal course in a collapsed condition with inner edges of said conveyor belt segments remaining collapsed as the belt segments enter said arcuate course and with outer edges of said conveyor belt segments expanding apart as the belt segments enter said arcuate course 7. The system of claim 6 wherein said conveyor belt is a collapsing belt of the kind constructed of a plurality of transverse segments linked together to form an endless conveyor belt formed of interlocking belt segments that can be expanded apart and condensed together so as to enable said conveyor belt to travel through transverse curves; and wherein said detector means is located so as to detect a collapsed condition of said belt near the commencement of a transverse curve; and wherein said controller means controls the operation of said conveyor drive means to maintain said conveyor belt in a collapsed condition at the location of said detector means so that an inside edge of said conveyor belt remains in a collapsed condition as the transverse segments traverse a transverse curve and so that an outside edge of said conveyor belt expands to an expanded condition as the transverse segments enter a transverse curve.

8. The system of claim 6 wherein said food processor comprises a spiral food freezer comprising a food product inlet, a food processing section and a food product outlet; and wherein said food product conveyor comprises a lineal infeed course terminating at said food product inlet for receiving food products and delivering such food products to said food product inlet, a spiral food processing course extending through said food processing section from said food product inlet to said food product outlet, an outfeed course, and a return course extending from said outfeed course to said infeed course; wherein said conveyor drive means maintains said conveyor belt in a collapsed condition along said infeed course so that said transverse segments can shift into a radial alignment at the commencement of said spiral food processing course; and wherein said detector means is located adjacent to the commencement of said spiral food processing course.

9. The system of claim 7 wherein said conveyor drive means comprises drive shaft means, sprocket means engaged with said conveyor belt, and motor means connected to said drive shaft means; wherein said detector means comprises an encoder disposed adjacent to said conveyor belt so that spacing between selected belt components can be detected; and wherein said controller means comprises circuit means coupled to said detector means and to said motor means for controlling said motor means.

10. The system of claim 8 wherein said conveyor drive means comprises drive shaft means, sprocket means engaged with said conveyor belt in said infeed course, and motor means connected to said drive shaft means; wherein said detector means comprises an encoder disposed adjacent to said conveyor belt in said infeed course so that spacing between selected belt components can be detected; and wherein said controller means comprises circuit means coupled to said detector means and to said motor means for controlling said motor means.

* * * * *